United States Patent

Green

[15] 3,690,761
[45] Sept. 12, 1972

[54] ACCESSORY FOR OPTICALLY REVERSING THE IMAGE IN COPY CAMERAS

[72] Inventor: Jeff Green, Ramsey, N.J.
[73] Assignee: Agfa-Gevaert Aktiengesellschaft, Leverkusen, Germany
[22] Filed: Dec. 8, 1970
[21] Appl. No.: 96,061

[30] Foreign Application Priority Data

Dec. 10, 1969 Germany .........G 69 47 770.9

[52] U.S. Cl. .................................355/43, 355/66
[51] Int. Cl. ............................................G03b 27/70
[58] Field of Search..........355/18, 43, 45, 51, 57, 60, 355/63, 65, 66

[56] References Cited

UNITED STATES PATENTS 1,268,609  6/1918  Powell..........................355/60

Primary Examiner—Samuel S. Matthews
Assistant Examiner—Richard A. Wintercorn
Attorney—Michael S. Striker

[57] ABSTRACT

An accessory for use in vertical or horizontal copy cameras to optically reverse the image of an original. A frame of the accessory is insertable into the housing of a copy camera between the lens and the easel for originals and carries a mirror which makes with the optical axis of the lens an angle of 45°. The frame further carries a second easel which can be placed in front of the mirror so that it is located at 90° to the easel of the camera. The image of an original which is placed onto the second easel is reversed so that the camera can make right reading negative or positive copies.

8 Claims, 3 Drawing Figures

Patented Sept. 12, 1972 3,690,761
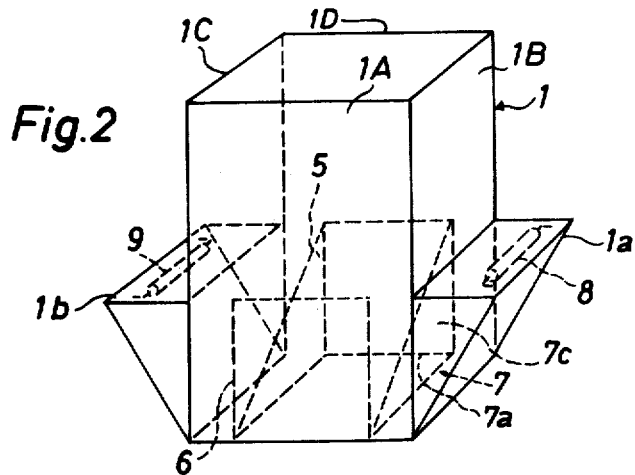
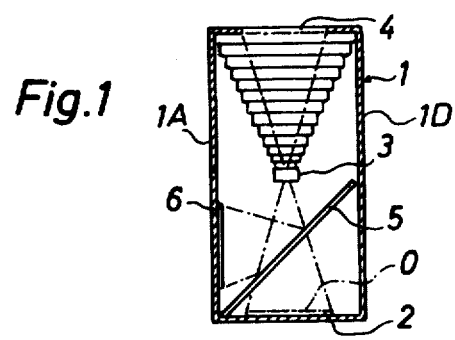
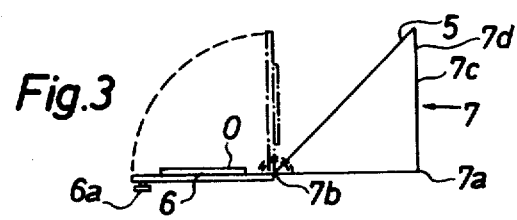
INVENTOR
JEFF GREEN

ACCESSORY FOR OPTICALLY REVERSING THE IMAGE IN COPY CAMERAS

BACKGROUND OF THE INVENTION

The present invention relates to copy cameras in general, and more particularly to improvements in accessories or auxiliary equipment for use in copy cameras to optically reverse the image of an original. Such optical reversal of the image is necessary when it is desired to produce a right reading negative or positive in a copy camera.

It is already known to provide a vertical copy camera with a device which can optically reverse the image of an original. Such device comprises a mirror which is mounted directly on the objective at an angle of 45° to the path of light rays. The camera is further provided with an extendable vertical support for reception of originals. The lamps are mounted laterally of the support. Such device exhibits the drawback that it does not permit for the utilization of the focussing mechanism in the camera. Therefore, the focussing must be carried out in a separate step, in addition to the step of selecting the appropriate ratio between the sizes of the original image and the reproduced image. The focussing is carried out by hand while the operator observes the frosted pane. Another drawback of the just described device is that it can be used only on special types of copy cameras; for example, it cannot be used on horizontal cameras. Also, the device is rather sturdy and heavy so that it is difficult to place it on top of a vertical copy camera.

SUMMARY OF THE INVENTION

An object of the invention is to provide a novel and improved accessory which can be used to optically reverse an image in all types of copy cameras including horizontal cameras, vertical cameras and so-called stat cameras (having a built-in prism).

Another object of the invention is to provide an accessory which can be used with existing copy cameras to produce right reading negatives or positives and which necessitates only minor alterations of existing copy cameras to facilitate its utilization therein.

A further object of the invention is to provide an accessory which permits the use of existing calibrations in a copy camera, which does not require a repositioning of light sources in existing copy cameras, which is of lightweight and compact design, which can be readily supported by the easel of a conventional vertical copy camera, and which allows for rapid conversion of a copy camera for making of exposures with or without optical reversal of images.

The invention is embodied in the combination of a copy camera of the type having a hollow housing for a picture taking lens and a first easel for originals with a novel accessory for optically reversing the images of the original. The accessory comprises a preferably metallic frame which is removably insertable into the housing of the copy camera, a mirror mounted on the frame in such position that it is located in a plane between the lens and the first easel at an angle of 45° to the optical axis of the lens when the frame is properly inserted into the housing of the camera, and a second easel insertable into the housing of the camera in front of the mirror and at an angle of 90° to the first easel whereby the mirror reverses the image of an original which is placed onto the second easel.

When the frame is properly inserted into the housing of the copy camera, the mirror and the second easel are preferably located in such positions that the shortest distance between the optical axis of the lens and the supporting plane of the second easel equals the distance between the supporting plane of the first easel and the point where the optical axis intersects the plane of the mirror. The latter preferably comprises a pane of vitreous material and a layer of metallic light reflecting material which is applied to its rear surface, namely, to that surface which faces away from the second easel.

The novel features which are considered as characteristic of the invention are set forth in particular in the appended claims. The improved accessory itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic vertical sectional view of a vertical copy camera containing an accessory which is constructed in accordance with the present invention;

FIG. 2 is an enlarged schematic perspective view of the housing of the camera and of the accessory; and FIG. 3 is a side elevational view of the accessory, showing its easel in two positions.

DESCRIPTION OF THE PREFERRED EMBODIMENTS

Referring first to FIG. 1, there is shown a vertical copy camera having a housing 1 the lowermost portion of which carries a fixedly mounted easel 2 for originals 0. The picture taking lens 3 of the copy camera is mounted above the easel 2 and is movable up and down with a suitable carriage, not shown. The photosensitive material which is to constitute a reproduction or copy is placed on a support 4 which is located at a level above the lens 3 and is adjustable with reference to the frame 1. The camera further comprises an automatic focussing device (not shown) which insures an optimum adjustment in dependency on the relationship between the frame 1, lens 3 and support 4. Such focussing devices are available on the market.

The space between the lens 3 and the easel 2 contains a mirror 5 which forms part of the improved accessory and is located in a plane making an angle of 45° with the optical axis. The mirror 5 constitutes a partition which divides a portion of the interior of the housing 1 into an upper and lower compartment and can reflect toward the lens 3 the image of an original which is placed onto a second easel 6 forming a second part of the improved accessory. The planes of the easels 2 and 6 make an angle of 90 degrees. The original will be placed onto the easel 6 when it is desired to obtain a right reading negative or a right reading positive, i.e., to optically reverse the image. The second easel 6 is adjacent to the vertical front wall 1A of the housing 1. The means for holding the original on the second easel 6 may comprise a suction head or any other suitable retaining device. When the exposure is made, the image of the original which is held to the second easel 6 is reproduced on photosensitive material which is placed onto the support 4.

FIG. 2 is a perspective view of the housing 1 of the vertical copy camera shown in FIG. 1. The housing 1 contains a prismatic frame 7 which rests on the easel 2 and supports the mirror 5. The second easel 6 is mounted close to the vertical front wall 1A of the housing 1, i.e., in front of the light-reflecting surface of the mirror 5. The vertical side walls 1B, 1C of the housing 1 are provided with outwardly projecting extensions 1a, 1b each having a substantially horizontal top panel located at a level below the lowermost position of the lens 3, two triangular side panels which are parallel to the front wall 1A, and an outer panel which makes with the plane of the easel 2 an angle of about 60°. Elongated light sources 8, 9 are respectively mounted in the extensions 1a, 1b so as to extend substantially at right angles to the plane of the second easel 6. The purpose of the light sources 8, 9 is to uniformly illuminate the original 0 on the easel 2 when the frame 7 of the accessory is removed from the housing 1. Additional light sources (not shown) can be provided at a level above the mirror 5; the light issuing from such sources is automatically directed toward an original on the second easel 6 when the frame 7 is inserted into the housing 1. It was found, however, that the original on the second easel 6 is illuminated with a very high degree of uniformity even if the additional light sources above the mirror 5 are removed or omitted. This is due to reflection of stray light, which issues from the sources 8, 9, on the internal surfaces of the housing 1. Such light impinges on the mirror 5 and is directed toward the original on the second easel 6. The intensity of light which issues from sources 8, 9 and is directed toward the easel 6 is less than the intensity of light furnished by sources which are installed at a level above the mirror 5. However, this merely necessitates somewhat longer exposure times which is tolerable because of the possibility of rapid focussing and rapid conversion from making copies of originals 0 on the easel 2 to making copies of originals on the easel 6, or vice versa.

FIG. 3 illustrates the prismatic frame 7 of the accessory in a side elevational view. The frame 7 is preferably assembled of parts which are welded, soldered or similarly bonded to each other and serve to support the mirror 5 in such position that the plane of the mirror makes with the optical axis of the lens 3 an angle of 45° when the frame 7 is inserted into the housing 1. The rear edge 7a of the frame of the copyboard 7 can be provided with a strip (not shown) or analogous locating means which cooperates with complementary locating means on or near to the rear wall 1D of the housing 1 to insure that the mirror 5 is located in an optimum position with reference to the lens 3 and second easel 6. The mirror 5 assumes such optimum position when the shortest distance between the easel 6 and the optical axis equals the distance between the easel 2 and that point in the plane of the mirror 5 which is located on the optical axis. Such mounting of the mirror 5 insures that the copy camera can be used for making exposures of originals on the easel 2 or 6 with the available focussing means and without any additional calibration. The edge 7a and the rear wall 1D can be said to constitute cooperating locating means on the frame 7 and housing 1 to hold the mirror 5 in the aforedescribed optimum position.

In accordance with a further feature of the invention, the second easel 6 is pivotally connected to the front edge of the frame 7 by a hinge 7b. This renders it possible to move the easel 6 to its horizontal position (indicated by solid lines) so as to facilitate the attachment or removal of an original 0. When a fresh original is secured to the easel 6, the latter is pivoted to the operative position (shown by phantom lines) whereby the camera is ready to make a copy of the freshly attached original. The easel 6 and the front wall 1A of the housing 1 can be provided with suitable detent means (indicated by a knob 6a) for releasably holding the easel 6 in the operative position.

The dimensions of the mirror 5 are selected as follows: Its width should at least equal the width of the largest original which is to be placed onto the easel 6 and its length (as measured from the hinge 7b toward the edge 7d of the frame 7) at least equals the length of the largest original on the easel 6 multiplied by the factor $\sqrt{2}$. That is due to the fact that the mirror 5 is placed at an angle of 45 degrees with reference to the optical axis. The mirror 5 preferably comprises a pane of vitreous material and a layer of light-reflecting metallic material which is preferably applied to its inner or rear side (facing the edge 7a) of the pane. Experiments have shown that even heavy dust deposits on the front surface of a rear-surfaced mirror will not reproduce on the film or photographic paper (i.e., on the photosensitive material which is placed onto the support 4). Dust which deposits on the front surface of the mirror 5 might affect the brilliancy of the image on the photosensitive material but such dust cannot be seen on the reproduction. The additional images produced by the front surface of a rear-surfaced mirror are reflected to the film or paper plane on the support 4. However, for line work and half-tone work, the contrast of such additional images is extremely low and papers or films having a gamma of 3.5 or higher eliminate all but the main image. Also, when low tone or continuous tone images are required, the use of a single plane or 360° plane polarizing filter eliminates all but the main image.

The operation:

If the camera is to produce an optically reversed image (i.e., a right reading negative or positive), the accessory 5–7 is inserted into the housing 1 in such a way that the locating edge 7a cooperates with the locating means on the rear wall 1D of the housing 1 so as to place the mirror 5 into the aforementioned optimum position. The easel 6 is moved to the horizontal position of FIG. 3 and the original 0 is secured thereto in any well known manner. The easel 6 is thereupon moved to the operative position into or close to the plane of the front wall 1A of the housing 1. The camera is then ready to make the exposure.

If the accessory of the present invention is to be used in a horizontal copy camera, the base of the frame 7 must be placed into a vertical plane adjacent to the vertical easel of such camera. The frame 7 can be suspended in the housing of a horizontal camera along the edge 7a or its rear panel 7c can be inserted into horizontal guide means of the housing in a horizontal copy camera. From there on, the exposures are made in the same way as with a vertical copy camera excepting that, when held in the operative position, the second easel 6 is located in a horizontal plane.

The customary focussing device of a horizontal or vertical copy camera can be used when the accessory is inserted into or when such accessory is withdrawn from the housing.

Without further analysis, the foregoing will so fully reveal the gist of the present invention that others can, by applying current knowledge, readily adapt it for various applications without omitting features which fairly constitute essential characteristics of the generic and specific aspects of my contribution to the art, and therefore, such adaptations should and are intended to be comprehended within the meaning and range of equivalence of the claims.

What is claimed as new and desired to be protected by Letters Patent is set forth in the appended claims.

1. The combination of a copy camera having a housing for a picture taking lens and an easel for originals with an accessory for optically reversing the images of originals, said accessory comprising a frame which is removably insertable into the housing of the camera, a mirror mounted in said frame in such position that it is located in a plane disposed between the lens and the easel and makes with the optical axis of the lens an angle of 45 degrees when the frame is inserted into the housing of the camera, and a second easel attached to said frame and insertable into the housing of the camera in front of said mirror and at an angle of 90° to the first mentioned easel whereby the mirror reverses the image of an original which is placed onto said second easel.

2. The combination of a copy camera having a housing for a picture taking lens and an easel for originals with an accessory for optically reversing the images of originals, said accessory comprising a frame which is removably insertable into the housing of the camera, a mirror mounted in said frame in such position that it is located in a plane disposed between the lens and the easel and makes with the optical axis of the lens an angle of 45° when the frame is inserted into the housing of the camera, a second easel insertable into the housing of the camera in front of said mirror and at an angle of 90° to the first mentioned easel whereby the mirror reverses the image of an original which is placed onto said second easel, and means connecting said second easel to said frame for pivotal movement to and from a position in which the second easel is substantially parallel to the first mentioned easel.

3. The combination as defined in claim 2, further comprising detent means for releasably holding said second easel at an angle of 90° to the first mentioned easel.

4. The combination of a copy camera having a housing for a picture taking lens and an easel for originals with an accessory for optically reversing the images of originals, said accessory comprising a frame which is removably insertable into the housing of the camera, a mirror mounted in said frame in such position that it is located in a plane disposed between the lens and the easel and makes with the optical axis of the lens an angle of 45° when the frame is inserted into the the housing of the camera, and a second easel insertable into the housing of the camera in front of said mirror and at an angle of 90° to the first mentioned easel whereby the mirror reverses the image of an original which is placed onto said second easel, the housing of the camera and said frame being provided with cooperating locating means for locating the frame in the housing in a position in which the distance between the first mentioned easel and the point where the optical axis of the lens intersects the plane of said mirror equals the shortest distance between the optical axis and said second easel when the latter is positioned at 90° to the first mentioned easel.

5. The combination of a copy camera having a housing for a picture taking lens and an easel for originals with an accessory for optically reversing the images of originals, said accessory comprising a frame which is removably insertable into the housing of the camera, a rear-surfaced mirror mounted in said frame in such position that it is located in a plane disposed between the lens and the easel and makes with the optical axis of the lens an angle of 45° when the frame is inserted into the housing of the camera, said mirror comprising a pane of vitreous material and a layer of light-reflecting metallic material applied to the rear surface of said pane, and a second easel insertable into the housing of the camera in front of said mirror and at an angle of 90° to the first mentioned easel whereby the mirror reverses the image of an original which is placed onto said second easel.

6. The combination of a copy camera having a housing for a picture taking lens and an easel for originals with an accessory for optically reversing the images of originals, said accessory comprising a frame which is removably insertable into the housing of the camera, a mirror mounted in said frame in such position that it is located in a plane disposed between the lens and the easel and makes with the optical axis of the lens an angle of 45° when the frame is inserted into the housing of the camera, and a second easel insertable into the housing of the camera in front of said mirror at an angle of 90° to the first mentioned easel whereby the mirror reverses the image of an original which is placed onto said second easel, the width of said mirror being at least equal to the width of the largest original which is to be placed onto said second easel and the height of said mirror being at least equal to the maximum height of an original on said second easel multiplied by $\sqrt{2}$.

7. The combination of a vertical copy camera having a housing for a picture taking lens and an easel for originals located below the lens with an accessory for optically reversing the images of originals, said accessory comprising a frame which is removably insertable into the housing of the camera to rest on said easel, a mirror mounted in said frame in such position that it is located in a plane disposed between the lens and the easel and makes with the optical axis of the lens an angle of 45 degrees when the frame is inserted into the housing of the camera and rests on the easel, and a second easel insertable into the housing of the camera in front of said mirror and at an angle of 90° to the first mentioned easel whereby the mirror reverses the image of an original which is placed onto said second easel.

8. The combination of a copy camera having a housing for a picture taking lens, an easel for originals and at least one source of light provided in the housing between the lens and the easel with an accessory for optically reversing the images of originals, said accessory comprising a frame which is removably insertable into the housing of the camera, a mirror mounted in said frame in such position that it is located in a plane disposed between the lens and the easel and makes with the optical axis of the lens an angle of 45° when the frame is inserted into the housing of the camera, and a second easel insertable into the housing of the camera in front of said mirror and at an angle of 90° to the first mentioned easel whereby the mirror reverses the image of an original which is placed onto said second easel.

* * * * *